March 21, 1961  J. R. V. DOLPHIN  2,975,850
COLLAPSIBLE ROAD VEHICLE
Filed Aug. 22, 1958  7 Sheets-Sheet 1
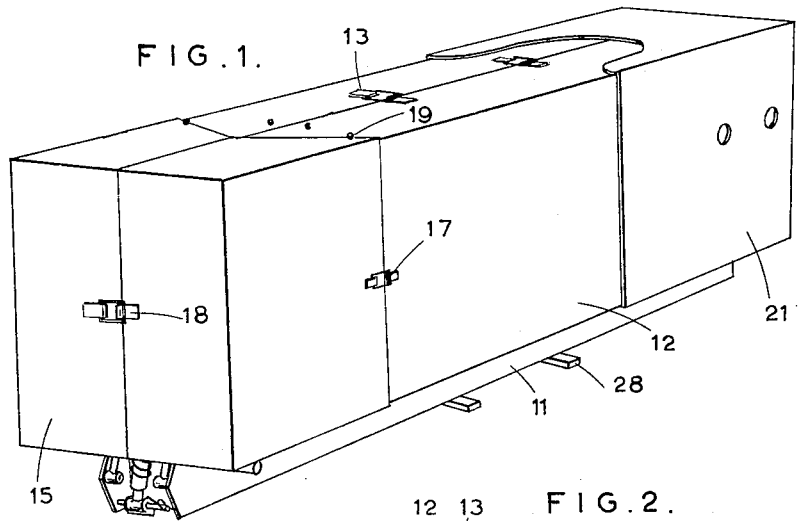
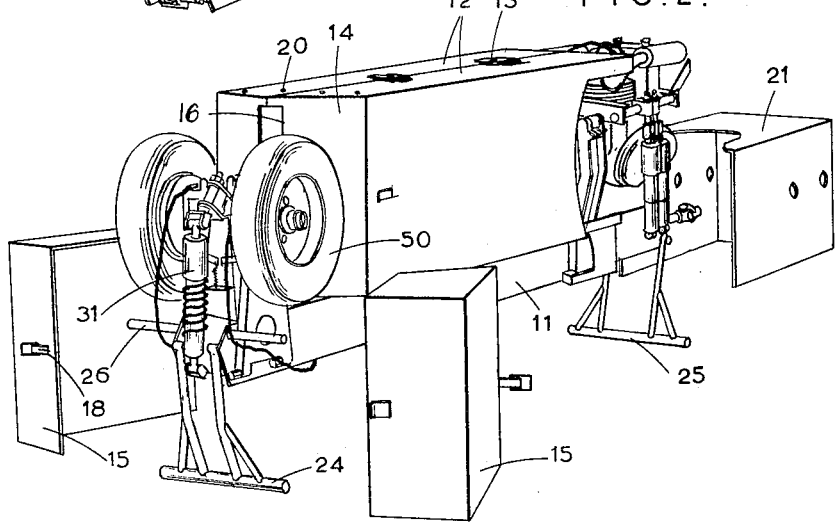
INVENTOR:
JOHN ROBERT VERNON DOLPHIN
BY
Richardson, David and Verdon
ATTORNEYS.

March 21, 1961  J. R. V. DOLPHIN  2,975,850
COLLAPSIBLE ROAD VEHICLE

Filed Aug. 22, 1958  7 Sheets-Sheet 2

INVENTOR:
JOHN ROBERT VERNON DOLPHIN
BY
Richardson, Davis and Nordon
ATTORNEYS.

March 21, 1961 J. R. V. DOLPHIN 2,975,850
COLLAPSIBLE ROAD VEHICLE
Filed Aug. 22, 1958 7 Sheets-Sheet 4
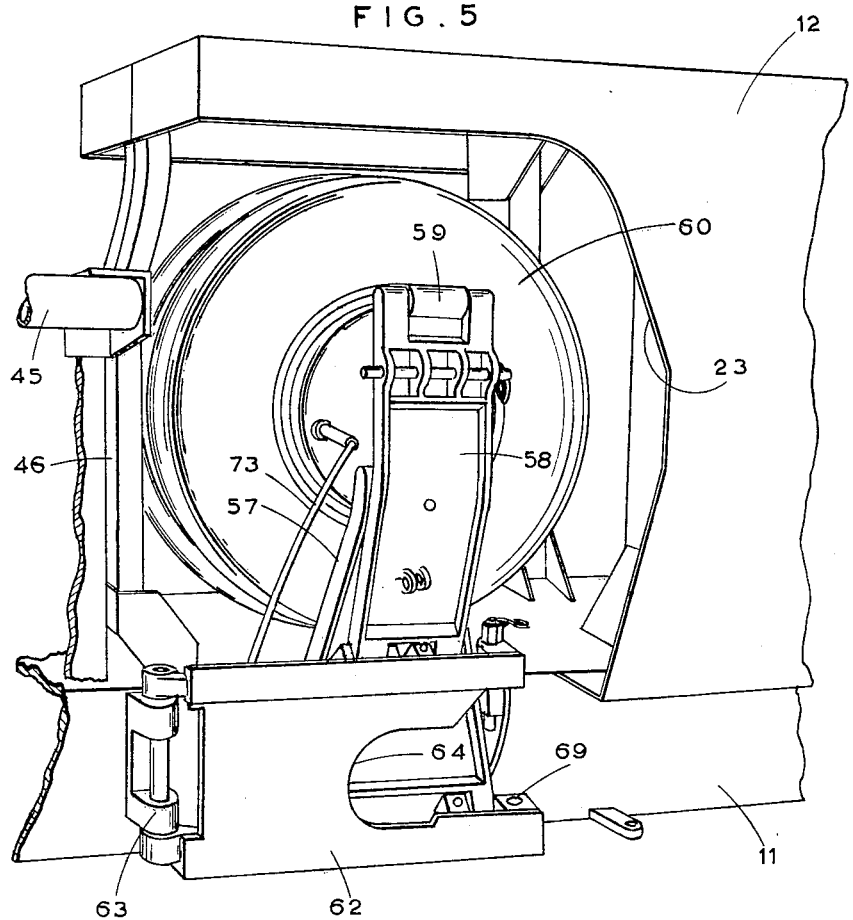
INVENTOR:
JOHN ROBERT VERNON DOLPHIN
BY
Richardson, David and Nordon
ATTORNEYS.

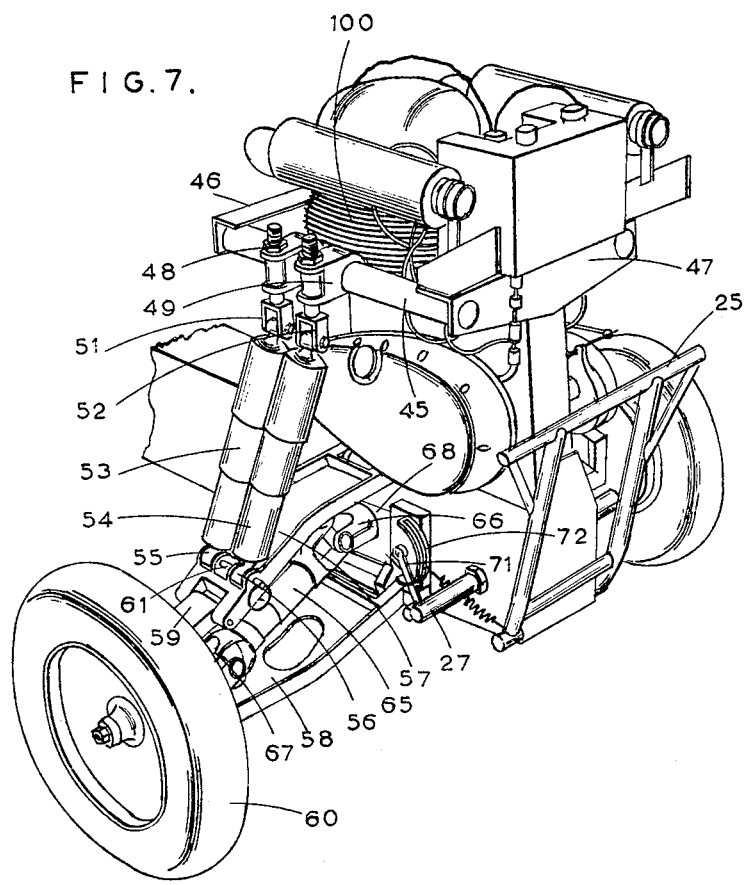

March 21, 1961 J. R. V. DOLPHIN 2,975,850
COLLAPSIBLE ROAD VEHICLE
Filed Aug. 22, 1958 7 Sheets-Sheet 6

INVENTOR:
JOHN ROBERT VERNON DOLPHIN

BY
Richardson, David and Nordon

ATTORNEYS.

March 21, 1961　　　J. R. V. DOLPHIN　　　2,975,850
COLLAPSIBLE ROAD VEHICLE

Filed Aug. 22, 1958　　　　　　　　　　　7 Sheets-Sheet 7

INVENTOR:
JOHN ROBERT VERNON DOLPHIN

BY
Richardson, David and Nerdon

ATTORNEYS.

United States Patent Office 2,975,850
Patented Mar. 21, 1961

2,975,850
COLLAPSIBLE ROAD VEHICLE

John Robert Vernon Dolphin, Whitchurch, England, assignor to Hydraulic Developments Limited, Reading, England, a British company Filed Aug. 22, 1958, Ser. No. 756,658

Claims priority, application Great Britain Aug. 30, 1957

7 Claims. (Cl. 180—1)

In the specification of prior British Patent No. 687,794 there is described a vehicle which is capable of being folded into a small compass for the purpose of transport, for example in an aeroplane, and which may be opened out to be a full four seater road vehicle.

The essence of the invention of this prior specification is the provision of a back-bone type chassis to which are hinged a pair of punt-like members providing a support for the seats, the back-bone type chassis frame supporting also an engine and the controls therefor and foldable road wheels.

The present invention is an improvement on the prior invention and contemplates a collapsible or foldable road vehicle comprising a back-bone type chassis frame on which are mounted an engine and the controls therefor, road wheels removable from an out-of-use position to an in-use position, suspension units for said road wheels and punt-like members or panniers hinged to said back-bone type chassis.

The engine is preferably mounted at the rear of the back-bone type chassis frame and the drive to the rear wheels is by direct half-shaft couplings.

Each road wheel is mounted pivotally on a pair of parallel links and the upper of said links is detachably secured to a suspension unit including a shock absorber on the chassis frame. The rear wheel parallel links are themselves pivoted to a bracket pivoted on a vertical axis on the chassis frame so as to be swingable with the wheel remaining in the vertical position from the out-of-use position first to an intermediate position and finally by a swinging of the supporting bracket to the in-use position. The half-shafts incorporating universal joints are then coupled to the rear wheels and spring suspension and shock absorber units are pinned to the parallel links. The rear wheel supporting brackets in their in-use position are clamped to the chassis frame.

The front wheels are simply swung from the out-of-use position to the in-use position on their parallel links. The suspension units for the front wheels are mounted on a post upstanding from the front end of the chassis frame and, in the out-of-use position, are rotated through 90° to lie in line with the chassis frame and, in the in-use position, lie at right angles to the chassis frame to be pinned to the parallel links supporting the front wheels.

The steering wheel is arranged for right or left hand drive and, in the out-of-use position is collapsed to lie along the chassis frame, whilst in the in-use position it is held by a bracket clamped to an upstanding structure at the forward end of the chassis frame.

The punt-like members or panniers are hinged to the chassis frame and, in the out-of-use position fold up to abut and to be clamped to each other to present a crate-like structure. The engine, rear suspension units and rear wheels in the out-of-use position may be enclosed by a removable cover clamped to the panniers, whilst the front suspension units are enclosed by a pair of removable members which, in the in-use position, are attached to the panniers to provide toe boards.

In the out-of-use position the entire vehicle is in the form of an elongated crate standing above the chassis frame and is given ground stability by lateral brackets which constitute a support for the panniers when in the in-use position.

The forward and rearward ends of the chassis frame support spring controlled stands which may be swung down to raise the crate-like structure from the ground to permit the vehicle to be opened out to the in-use position. These stands, when the vehicle is erected, fold up to lie fore and aft of the chassis frame. On each end of the chassis frame also is provided carrying handles for transport of the vehicle when in the out-of-use or crated condition.

Each pannier supports one or more collapsible seat frames having canvas or like seats and seat backs.

The vehicle in the out-of-use or crated condition may be transported with great facility and may, if desired, be dropped by parachute from an aeroplane, whilst its erection to the in-use position takes a very little time and there is then provided a full four-seater or a freight carrying road vehicle.

The invention is illustrated in the accompanying drawings of which:

Figure 1 is a perspective view of the vehicle in the fully collapsed and crated condition;

Figure 2 is a perspective view showing the first stage of the erection of the vehicle;

Figure 5 is a part side view showing the rear wheels in the collapsed position;

Figure 7 is a part perspective view of the rear of the vehicle, ready to drive away.

Figure 3:
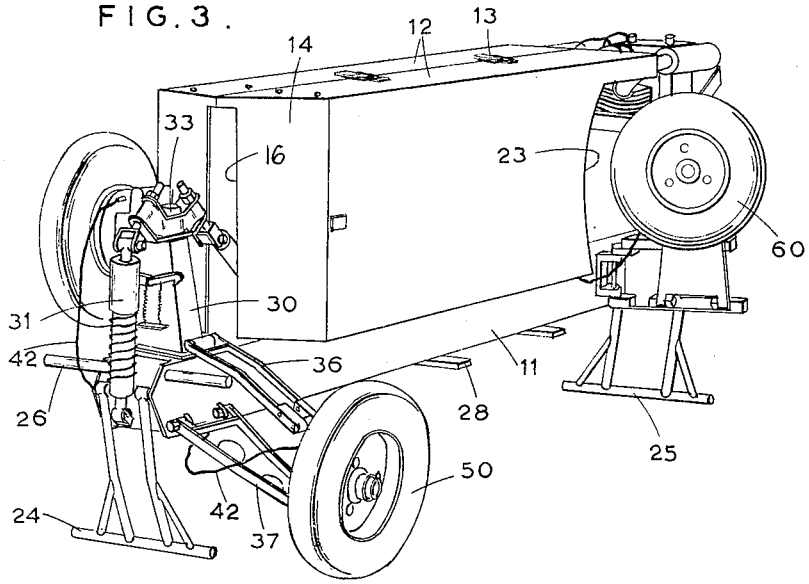
Figure 3 is a perspective view showing the next stage in the erection of the front wheels and suspension units.

The vehicle comprises a box section central back-bone type chassis frame 11 which constitutes the principal support for all the elements of the vehicle. A pair of panniers 12 is hinged to the chassis frame to be swung from the position shown in Figures 1, 2 and 3, in which position they present a crate-like structure and are clamped together by the catches 13, to the position shown in Figures 4, 6, 8 and 9 to 11 where they provide, on each side of the chassis frame the floor of the vehicle. The forward ends of the panniers are formed at an angle, as at 14, to provide toe boards, when in the open position, the toe boards being completed by separate cover members 15, which in the crated condition enclose the front suspension units and road wheels, being secured to the panniers by catches 17 and to each other by catches 18. The cover members are formed with notches 19 which engage pegs 20 outstanding from the panniers, and are held in mounted position by the catches 17. When the panniers are in the open position they are held by brackets 28, outstanding from the chassis frame.

The rear-mounted engine and the rear suspension units and road wheels, may be enclosed, in the crated condition by an end cover plate 21 which does not constitute a component of the erected vehicle.

The angled front toe boards 14 of the panniers are cut away, as at 16, to accommodate the front suspension units in the folded or collapsed position whilst the rear ends of the bottom plates of the panniers are cut away, as at 23, to accommodate the rear wheels in the folded or collapsed position.

At each end of the chassis frame are provided collapsible spring controlled stands 24 and 25, which are swung downwardly, for example, from the position shown in Figures 1 and 7, to the position shown in Figures 2 and 3, to support the crated structure on the ground in a position ready for erection into the vehicle. Handles 26 and 27 are provided at each end of the chassis frame.

The front suspension units are mounted on a post or pillar 30 upstanding from the reinforced front end of the chassis frame and consist of combined shock absorber units and springs 31, pivotally mounted at their upper ends in shackles 32 themselves secured in an angled bracket 33 journalled on top of the pillar 30. In the folded or collapsed position, these units are swung on the pillar 30, to the position shown in Figures 2 and 3, to lie along the length of the chassis frame and in the in-use position are swung to the position shown in Figure 4 to lie laterally of the chassis frame.

Each front wheel 50 is journalled in a bracket 35 which is pivoted to a pair of parallel arms 36 and 37, themselves pivoted at their inner ends to the front end of the chassis frame providing thereby a parallelogram linkage. The lower end of each shock absorber unit carries an eye 38 which in the erected position, passes through the bifurcated end 39 of the upper arm 36 and is pivoted therein by means of a removable pin 40 which is passed through aligned holes 41, in said bifurcated end of the arm. The pin 40 may be retained by means of a lanyard (not shown) secured to the chassis frame. Flexible brake cables 42 are coupled to the wheels 50.

The front of the pillar 30 has pivoted thereto a pair of spring clips 43 to hold the front wheel suspension unit in the "up" position when the vehicle is folded.

The engine 100 is fixedly mounted on the rear end of the chassis, and may be of any suitable type.

The rear suspension units are mounted on a bar 45 secured in front and rear upstanding plates 46 and 47 constituting a rear reinforcing post which also supports the engine 100, brackets 48 and 49 carrying shackles 51 and 52 in which shock-absorber units 53 and 54 are journalled. The lower ends of the shock-absorber units carry eyes 55 and 56 which engage the upper arm 57 of the parallel arms 57 and 58 providing a parallelogram linkage.

Each rear wheel 60 is journalled on a bracket 59 having an upper limb to lie between the bifurcated end of the upper arm 57, and to said arm, the eyes 55 and 56 are pivoted by means of a removable pin 61, retained by a lanyard (not shown).

Figure 6:
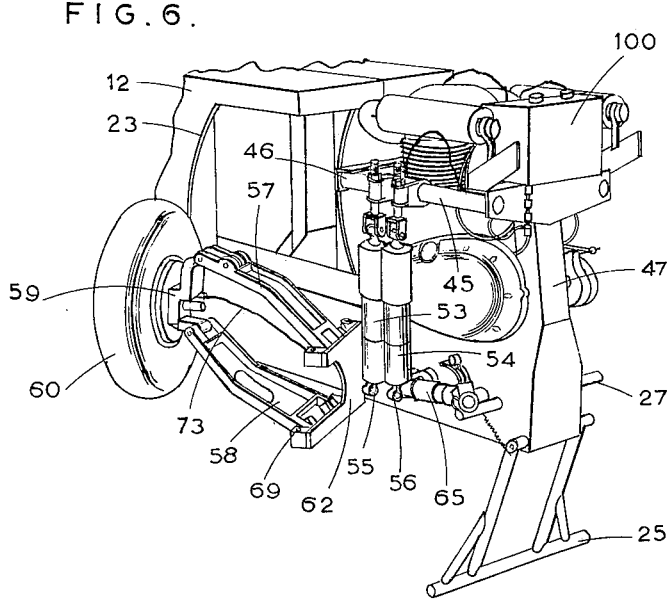
Figure 6 is a part perspective view showing the first stage in the erection of the rear wheels.
Figure 4:
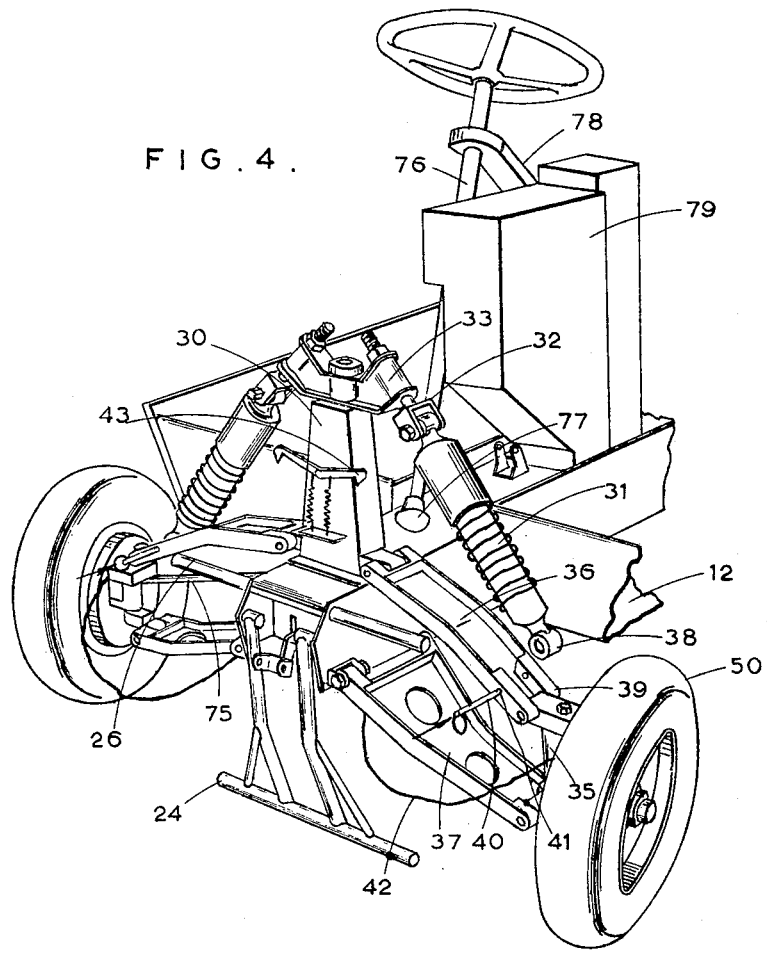
Figure 4 is a part perspective view of the fully erected front wheels and suspension units.
Figure 8:
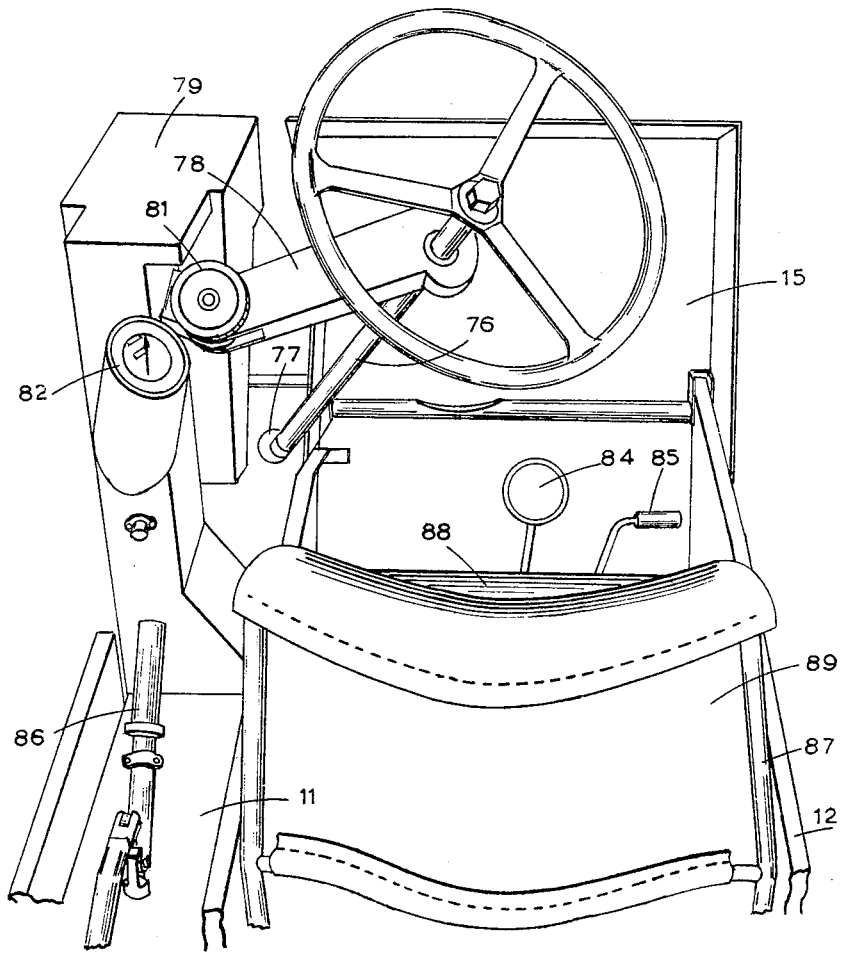
Figure 8 is a part front perspective view showing the controls.
Figure 9:
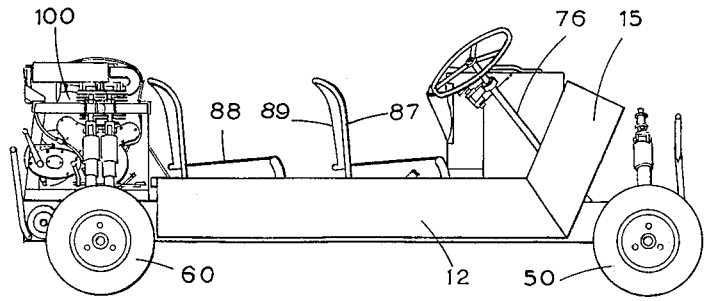
Figures 9, 10 and 11 are respectively, side elevation plan and front elevation of the vehicle ready to drive away.
Figure 10:
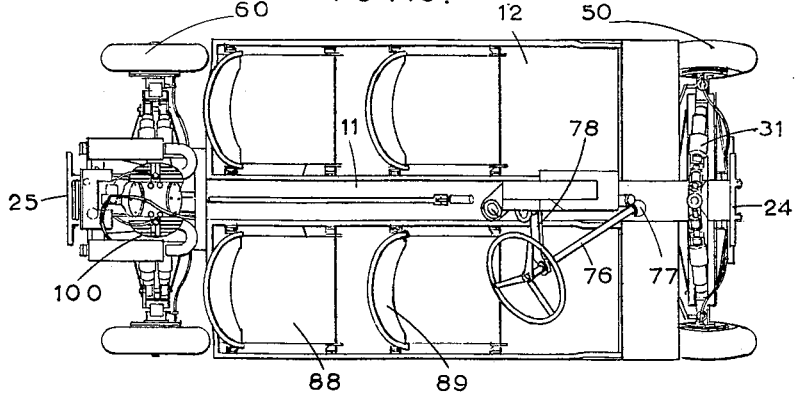
Figure 11:
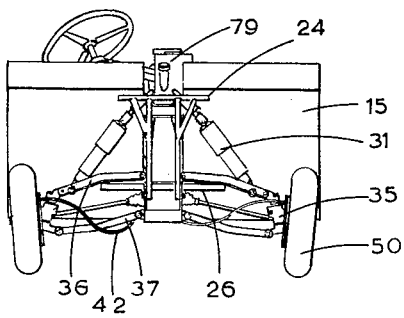

The parallel arms 57 and 58 are pivoted at their inner ends to a bracket 62 itself hinged as at 63 to the rear end of the chassis frame, the bracket 62 having a cut out 64 to give clearance to the half shaft 65, which is coupled to the drive shaft by a universal coupling 66, so that it may lie in the collapsed position shown in Figure 6, resting on the rear handle 27, or be swung to the in-use position shown in Figure 7, in which it is coupled, by a universal coupling 67 to the road wheel. It will be clear, of course, that the construction is identical on the right and left of the chassis.

The semi-circular cut-out 64 of the bracket 62, in the erected position surrounds a rear half shaft. The bifurcated arms of the bracket 62 are formed with holes 69 in which pass oppositely disposed thrust pins (not shown) operable by a cam lever 71 operating in a notched quadrant 72; thus the actuation of the lever 71 securely locks the bracket 62 and hence the rear wheels, to the chassis frame.

As with the front wheels, flexible brake cables 73 are coupled to the rear wheels.

The front wheels are permanently connected to a steering box (not shown) by track rods 75, foldable with the parallel arms 36 and 37 and, the steering column 76 enters the steering box through a universal coupling 77. The steering column is supported by an arm 78 pivotally secured to a front vertical structure 79 and clamped in position by clamp screw 81. The structure 79 carries the control instruments, such as a speedometer 82. Brake and accelerator pedals 84 and 85 are permanently secured in the one pannier (changeable as desired for right and left-hand drive) and connected by flexible couplings, through the chassis frame to the brakes and engine. Gear and clutch lever 86 is shown on the chassis frame.

Collapsible tubular seat frames 87 are shown, having for example, canvas seats 88 and seat backs 89. The seats are mounted on the panniers and are foldable to lie completely therein, when the vehicle is to be crated.

The vehicle is erected in the simplest and quickest manner by adopting for example the following sequence of operations:

(1) Place the crate on the ground (Figure 1) remove the end covers 15, 21 and raise by the handles 26 and 27 or by lifting bars (not shown) to lift the vehicle on to the stands 24 and 25 (Figure 2);

(2) Swing the front wheels downwardly in turn maintaining them always in a vertical plane to the running position;

(3) Swing the rear wheels in turn outwardly on brackets 62 and then downwardly (Figures 3 and 6) maintaining them also in a vertical plane to the running position, then clamp brackets 62 to the chassis frame by the cam lever 71;

(4) Swing the panniers downwardly until they are supported by brackets 28;

(5) Rotate the front suspension units on pillar 30, couple the combined shock absorbers and springs to the upper of the parallel arms 36 by pins 40;

(6) Replace covers 15 in scuttle position;

(7) Couple the rear shock absorbers 53 and 54 to the upper of the parallel arms 57 and the half shafts 65 to the rear wheel axles;

(8) Raise the seats, swing the steering column 76 to the in-use position and clamp by the screw 81;

(9) Release the stands 24 and 25 and the vehicle is ready to drive away;

It will be clear that the erection of the vehicle, from the time it is placed on the ground in the crated condition (for example as it is removed from an aeroplane) to the time that it is ready to drive away, will take very little time, that there are no loose parts (except the front covers 15 or scuttles and the shackle pins, which latter are retained by lanyards) to be sought for, or which might be mislaid, and that there is provided a four seater or freight vehicle of great strength and reliability.

I claim:

1. A road vehicle collapsible from an in-use position to an out-of-use crated position, comprising a backbone chassis frame, a pair of panniers hinged one at each side of said frame, at least two reinforcing posts each upstanding from the front and the rear of said frame, respectively, an engine connected to drive said road vehicle, said engine being supported by the rear reinforcing post, controls for said engine housed within said chassis frame, a pair of front wheels, a pair of parallelogram linkages each pivoted outboard to a front wheel and inboard to said chassis frame, a pair of suspension units pivotally mounted on said front reinforcing post, means removably to attach one of said suspension units to an outboard end of each said parallelogram linkages, steering mechanism for said front wheels, a pair of rear wheels, a pair of rear parallelogram linkages each pivoted outboard to a rear wheel and pivoted inboard to the chassis frame, a pair of rear suspension units pivoted to the rear reinforcing post, and means removably to attach said rear suspension units one to an outboard end of each of said rear parallelogram linkages.

2. A road vehicle as claimed in claim 1, in which the front suspension units are coupled to the upper arm of the parallelogram linkage by removable pins.

3. A road vehicle as claimed in claim 1, in which the rear suspension units are coupled to the upper arm of the parallelogram linkage by removable pins.

4. A road vehicle collapsible from an in-use position to an out-of-use crated position, comprising a backbone chassis frame, a pair of panniers hinged one at each side of said frame, at least two reinforcing posts each upstanding from the front and the rear of said frame, respectively, an engine connected to drive said road vehicle, said engine being supported by the rear reinforcing post, controls for said engine housed within said chassis frame, a pair of front wheels, a pair of parallelogram linkages each pivoted outboard to a front wheel and inboard to said chassis frame, a pair of front suspension units, an angled bracket pivotally supporting said suspension units and rotatably mounted on said front reinforcing post, means removably to attach one of said units to an outboard end of each said parallelogram linkages, steering mechanism for said front wheels, a pair of rear wheels, a pair of rear parallelogram linkages each pivoted outboard to a rear wheel and pivoted inboard to said chassis frame, a pair of rear suspension units pivoted to the rear reinforcing post, and means removably to attach said rear suspension units one to an outboard end of each said rear parallelogram linkages.

5. A road vehicle collapsible from an in-use position to an out-of-use crated position, comprising a backbone chassis frame, a pair of panniers hinged one at each side of said frame, at least two reinforcing posts each upstanding from the front and the rear of said frame, respectively, an engine connected to drive said road vehicle, said engine being supported by the rear reinforcing post, controls for said engine housed within said chassis frame, a pair of front wheels, a pair of parallelogram linkages each pivoted outboard to a front wheel and inboard to said chassis frame, a pair of suspension units pivotally mounted on said front reinforcing posts, means removably to attach one of said units to an outboard end of each said parallelogram linkages steering mechanism for said front wheels, a pair of rear wheels, a pair of rear parallelogram linkages each pivoted outboard to a rear wheel and pivoted inboard to a bracket swingably mounted on the chassis frame, a pair of rear suspension units pivoted to the rear reinforcing post, and means removably to attach said rear suspension units one to an outboard end of each said rear parallelogram linkages.

6. A road vehicle collapsible from an in-use position to an out-of-use crated position, comprising a backbone chassis frame, a pair of panniers hinged one at each side of said frame, at least two reinforcing posts each upstanding from the front and the rear of said frame, respectively, an engine connected to drive said road vehicle, said engine being supported by the rear reinforcing post, controls for said engine housed within said chassis frame, a pair of front wheels, a pair of parallelogram linkages each pivoted outboard to a front wheel and inboard to said chassis frame, a pair of suspension units pivotally mounted on said front reinforcing posts, means removably to attach one of said units to an outboard end of each said parallelogram linkages, a steering box mounted on said chassis frame, track rods extending from said steering box and pivotally coupled one to each front wheel, said track rods being swingable as one with said parallelogram linkages, a pair of rear wheels, a pair of rear parallelogram linkages each pivoted outboard to a rear wheel and pivoted inboard to the chassis frame, a pair of rear suspension units pivoted to the rear reinforcing post, and means removably to attach said rear suspension units one to an outboard end of each said rear parallelogram linkages.

7. A road vehicle collapsible from an in-use position to an out-of-use crated position, comprising a backbone chassis frame, a pair of panniers hinged one at each side of said frame, at least two reinforcing posts each upstanding from the front and the rear of said frame, respectively, an engine connected to drive said road vehicle, said engine being supported by the rear reinforcing post, controls for said engine housed within said chassis frame, a pair of front wheels, a pair of parallelogram linkages each pivoted outboard to a front wheel and inboard to said chassis frame, a pair of suspension units pivotally mounted on said front reinforcing posts, means removably to attach one of said units to an outboard end of each of said parallelogram linkages, steering mechanism for said front wheels, a pair of rear wheels, a pair of rear parallelogram linkages each pivoted outboard to a rear wheel and pivoted inboard to the chassis frame, a pair of rear suspension units pivoted to the rear reinforcing post, means removably to attach said rear suspension units one to an outboard end of each said rear parallelogram linkages, half shafts extending from universal couplings on the engine drive shaft, and means removably to attach said half shafts one to each of said rear wheels.

References Cited in the file of this patent

UNITED STATES PATENTS

| | | |
|---|---|---|
| 2,326,482 | Moffitt | Aug. 10, 1943 |
| 2,536,749 | Jenner et al. | Jan. 2, 1951 |

OTHER REFERENCES

| | | |
|---|---|---|
| 546,370 | France | Aug. 18, 1922 |
| 687,794 | Great Britain | Feb. 18, 1953 |